(12) United States Patent
Ratzel et al.

(10) Patent No.: US 7,084,808 B2
(45) Date of Patent: Aug. 1, 2006

(54) ANTENNA SYSTEM

(75) Inventors: Achim Ratzel, Bempflingen (DE); Dirk Wendt, Dettingen (DE); Peter Schaich, Kohlberg (DE)

(73) Assignee: Hirschmann Electronics GmbH & Co. KG, Neckartenzlingen (DE)

( * ) Notice: Subject to any disclaimer, the term of this patent is extended or adjusted under 35 U.S.C. 154(b) by 0 days.

(21) Appl. No.: 10/416,959

(22) PCT Filed: Jan. 11, 2001

(86) PCT No.: PCT/EP01/00255

§ 371 (c)(1),
(2), (4) Date: Sep. 11, 2003

(87) PCT Pub. No.: WO02/41537

PCT Pub. Date: May 23, 2002

(65) Prior Publication Data

US 2004/0058690 A1    Mar. 25, 2004

(30) Foreign Application Priority Data

Nov. 20, 2000  (DE) ................................ 200 19 677

(51) Int. Cl.
*G01S 7/40* (2006.01)
*H01Q 3/24* (2006.01)
*H04B 17/00* (2006.01)
*H04B 1/06* (2006.01)

(52) U.S. Cl. .................. 342/173; 342/374; 455/67.14; 455/226.1; 455/277.1

(58) Field of Classification Search ................ 342/360, 342/173, 368, 374; 455/140, 226.1, 226.2, 455/67.14, 272, 277.1
See application file for complete search history.

(56) References Cited

U.S. PATENT DOCUMENTS

| 4,984,293 A | 1/1991 | Cummings et al. |
| 5,313,660 A | 5/1994 | Lindenmeir et al. |
| 5,835,850 A * | 11/1998 | Kumar ..................... 455/67.14 |
| 6,011,962 A | 1/2000 | Lindenmeir et al. |
| 2002/0154059 A1* | 10/2002 | Lindenmeier et al. ...... 342/374 |
| 2003/0124982 A1* | 7/2003 | Saari et al. ................. 455/67.4 |

FOREIGN PATENT DOCUMENTS

| DE | 196 18 333 A1 | 11/1997 |
| EP | 0 825 734 A2 | 2/1998 |
| WO | WO 00/21226 | 4/2000 |

* cited by examiner

*Primary Examiner*—Thomas H. Tarcza
*Assistant Examiner*—Fred H Mull
(74) *Attorney, Agent, or Firm*—Fulbright & Jaworski, LLP

(57) ABSTRACT

The invention relates to an antenna system (1) comprising several antennae (2), which can be connected to at least two receivers (4, 4') via a combination unit. According to the invention, a signal processing unit (5) for evaluating the output signals of the receivers (4, 4') and a control unit (10) are provided, by means of which at least one of the antennae can be switched to transmit mode in order to conduct a self-test. These antennae (2) transmit test signals with a test frequency that is pre-set by a first receiver (4). Said test signals are fed into at least one other antenna (2) that, via the combination device (3), is connected to the second receiver (4') whose frequency is tuned to the test frequency. In order to conduct the self-test, the receiving levels of the second receiver (4') are recorded as actual values and compared with predetermined set values. This results in the realization of an antenna system in which a function check is conducted with the least possible amount of complexity.

31 Claims, 1 Drawing Sheet

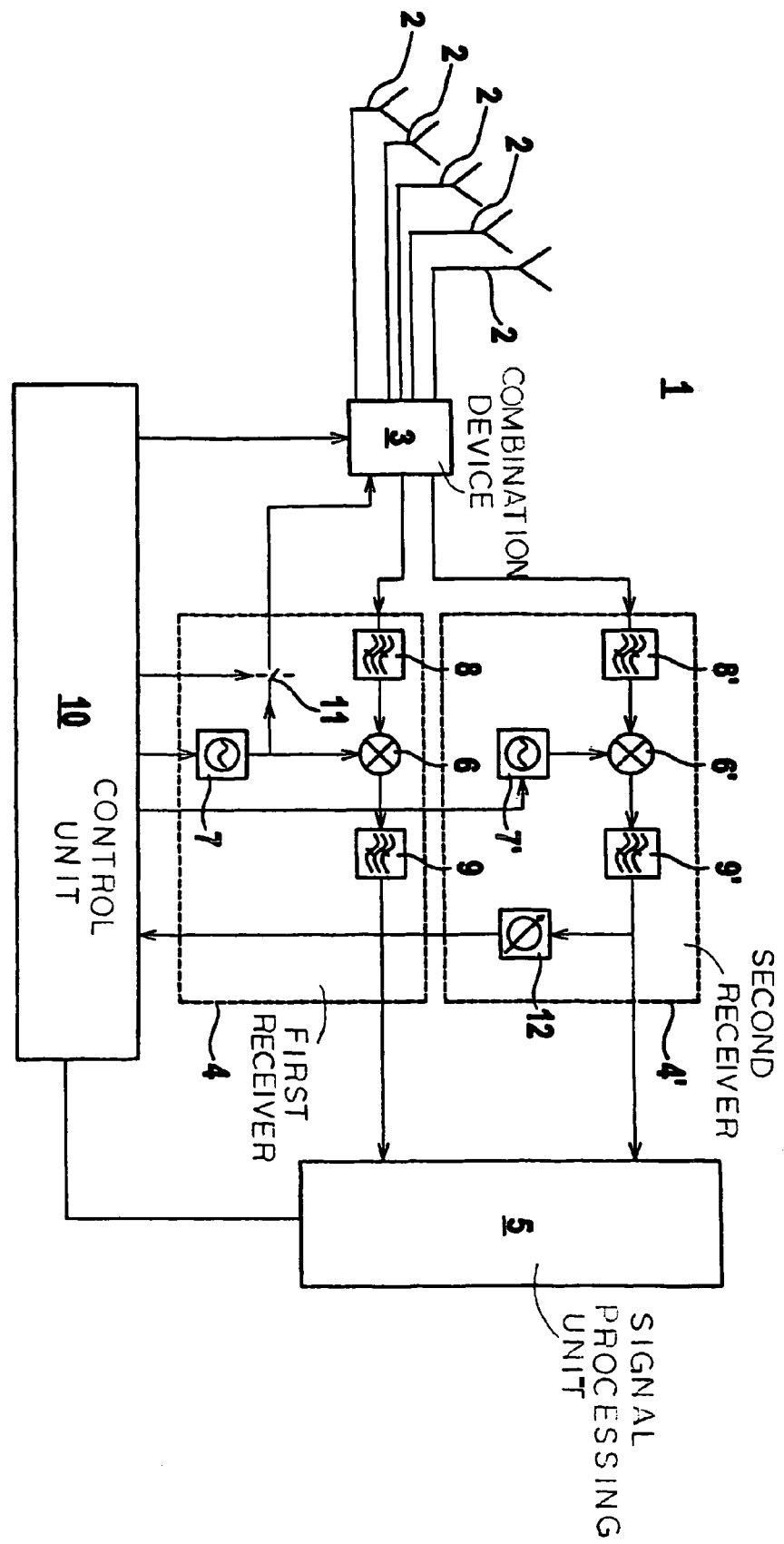

ANTENNA SYSTEM

BACKGROUND OF THE INVENTION

1. Field of the Invention

The invention relates to an antenna system, and, more particularly, the present invention relates to an antenna system having at least two antennae and at least two receivers with self-testing circuitry.

2. Description of the Related Technology

An antenna system is known from DE 196 18 333 A1. This prior antenna system is a component with a mobile broadcast-receiving system and has at least one antenna. The signals received by the antenna are delivered to a receiver made as a superheterodyne receiver. The superheterodyne receiver has a mixer to which one bandpass filter at a time on the input side and the output side is connected. Moreover an oscillator is assigned to the mixer. The bandpass filter upstream of the mixer is used for mirror frequency suppression. The mixer mixes the signal which is at the input with the oscillator signal. The resulting intermediate frequency signal is filtered in the bandpass filter downstream of the mixer and then delivered to a signal processing unit for further processing.

To check operation of this antenna system, there is a switch that can be switched for control operation in which broadcast signals are received and evaluated, and to a test mode in which a self-test is carried out.

To carry out the self-test there is a separate transmitting antenna and a circuit arrangement connected to the transmitting antenna.

The circuit arrangement has a frequency converter which produces a high frequency output signal with which the transmitting antenna is energized.

The frequency converter is connected to the oscillator of the superheterodyne receiver. Moreover the frequency converter is connected to an intermediate frequency oscillator which is likewise a component of the circuit arrangement. Alternatively to the intermediate frequency oscillator there can be an intermediate frequency limiter which is connected to the output of the superheterodyne receiver.

The frequency of the high frequency output signal which is generated in the frequency converter is dictated by the intermediate frequency oscillator and the oscillator of the superheterodyne receiver and thus is tuned to the frequency of the superheterodyne receiver.

The high frequency output signal is capacitively coupled to the antenna of the antenna system via the transmitting antenna.

The signals at the output of the superheterodyne receiver are detected by a measurement device for carrying out the self-test.

The disadvantage in this antenna system is that an additional circuit arrangement with a separate transmitting antenna is necessary for carrying out the self-test. This results in undesirably high cost for carrying out the self-test.

SUMMARY OF THE INVENTION

An object of the invention is to make available an antenna system in which operation can be checked with as little effort as possible.

This and other objects may be achieved by the antenna system according to the present invention which has several antennae that can be connected to at least two receivers in given combinations via a combination unit. The antenna system furthermore has a signal processing unit for evaluation of the output signals of the receiver and a control unit by means of which at least one of the antennae can be switched to the transmit mode to carry out a self-test. This selected transmit antenna with a test frequency specified via a first receiver sends test signals which are coupled into at least one other antenna which is connected via the combination device to the second receiver with a frequency tuned to the test frequency. The receiving level of the second receiver is detected as an actual value and compared to given setpoints to carry out the self-test.

The antenna system of the present invention has at least two receivers which in control operation of the antenna system are operated preferably simultaneously. The first receiver is used preferably for preprocessing of the broadcast signals which are received by one antenna and which are instantaneously received and output in the broadcast receiving system. With the other receiver broadcast signals which are received with other antennae are processed to make available additional functions for the broadcast-receiving system.

These additional functions can be performed, for example, by reception optimization functions, especially Radio Data System (RDS) functions. If a radio transmitter signal is received at a certain frequency with the broadcast receiving system, by means of the second receiver it is checked whether the same content can be received better at other frequencies, i.e. with signals of higher amplitudes or with better signal/noise ratios.

According to one aspect of the invention, two receivers are used for carrying out the self-test. The self-test and its control are expediently carried out centrally in the control unit.

To do this, the control unit switches one of the antennae of the antenna system to transmit, this antenna sends test signals with a test frequency which is dictated by the first receiver.

The antenna which is to be tested at the time is connected to the second receiver with a frequency tuned to the test frequency. To carry out the self-test the reception levels of the test signal are acquired as actual values and compared to given setpoints.

A major advantage of the antenna system according to the present invention consists in that by using the two receivers to carry out the self-test, separate additional components can be almost completely abandoned. Therefore, the self-test can be carried out with only little additional circuit cost.

In particular, it is advantageous for the antennae of the antenna system for carrying out the self-test to be switchable to transmit so that there need not be a separate antenna for testing the operation of the antenna system.

Furthermore, it is advantageous for the test frequency to be tunable via the control unit so that comprehensive and reliable testing of operation is guaranteed.

BRIEF DESCRIPTION OF THE DRAWINGS

An antenna system to which the invention is however not limited is explained below with a figure showing an embodiment for the present invention.

The Figure shows a blocked diagram of an embodiment of the antenna system according to the present invention.

DETAILED DESCRIPTION

The Figure shows one embodiment of the antenna system 1 according to the present invention. The antenna system 1 is a component of a mobile broadcast/receiving system which is installed in a motor vehicle (not shown) in this example.

The antenna system 1 has several antennae 2 which are preferably integrated in a back window of the motor vehicle. The antennae 2 can be made differently and can be used to receive broadcast signals of various frequency ranges. Moreover, individual antennae 2 also can be intended for receiving additional signals which are used for example for remote locking of the motor vehicle.

The antennae 2 are connected to two receivers 4, 4' via a combination device 3. Alternatively, more than two receivers 4, 4' also can be connected. The outputs of the receiver units are routed to a signal processing unit 5 which is formed as an analog integrated circuit or a digital signal processor.

The combination device 3 is formed using a logic circuit, and by the use of which a given combination of antennae 2 can be switched to each of the receivers 4, 4'. Thus, with the combination device 3 a choice can be made as to which of the antennae 2 are assigned to the individual receivers 4, 4'.

The receivers 4, 4' are made as superheterodyne receivers with an essentially identical structure.

Here each of the receivers 4, 4' has a mixer 6, 6' with an oscillator 7, 7' connected to an input for the mixer 6, 6'. From one output of the combination device 3 a feed line leads via a first bandpass filter 8, 8' to a second input of the mixer 6, 6'. The output of the mixer 6, 6' is routed via a second bandpass filter 9, 9' to the signal processing unit 5.

The first bandpass filter 8, 8' is tuned to the frequency of the broadcast signals received with the antennae 2. The filtered output signal of the combination device 3 and the signal of the oscillator 7, 7' are mixed in the mixer 6, 6', so that a lower frequency intermediate frequency signal is generated from the high frequency broadcast signal. The intermediate frequency signal corresponds to the difference of the frequencies of the broadcast signal and of the oscillator 7, 7'. The intermediate frequency signal is then filtered in the second bandpass filter 9, 9' which is permanently set to the intermediate frequency. The output signal of the respective receiver 4, 4' obtained in this way is further processed in the signal processing unit 5.

The combination device 3 is controlled via the control unit 10 which is preferably formed using a microcontroller. The oscillators 7, 7' of the receivers 4, 4' are controlled by the control unit 10.

A self-test is run according to one aspect for the invention to check serviceability. The self-test preferably is carried out during given time intervals which interrupt the control operation of the antenna system 1. Typically one such self-test takes place after completed assembly of the motor vehicle, during parking times of the motor vehicle in a shop, and when the broadcast-receiving system is turned on. Execution and control of the self-test takes place centrally via the control unit 10.

To control the self-test, there especially is a switch 11 which is connected to the control unit 10. The switch 11 is located on a feed line which connects the oscillator 7 of the first receiver 4 to the combination device 3.

To carry out the self-test, the output of the second receiver 4' has a level measuring device 12. The level measuring device 12 is connected to the control unit 10 so that the reception level detected with the level measurement device 12 is fed into the control unit 10 for further evaluation.

During the control operation of the antenna system 1 broadcast signals in particular are received with the antennae 2. They are the broadcast signals of the radio transmitter which is set at the time in the broadcast/receiving system.

At least one other antenna 2 is switched to the other receiver 4' or 4. In this receiver 4' or 4 the broadcast signals are readily received and evaluated to prepare additional functions for the broadcast/receiver system. These additional functions can be formed especially by reception optimization functions, for example, the Radio Data System (RDS) function.

This function is used to optimize reception of a certain radio transmitter in the broadcast-reception system.

While the broadcast signals of the radio transmitter which have been received in the first receiver 4 or 4' are reproduced via the broadcast-reception system; in the background broadcast signals having the same content which however are sent with different frequencies and which are received with the second receiver 4' or 4 are evaluated. Then in the signal processing unit 5 a check is made as to what frequency broadcast signals of the same content are optimally received, i.e. for which frequency the highest signal amplitude and/or the best signal/noise ratio is obtained. Next the broadcast signals with the optimum frequency for reproduction can be selected via the signal processing unit 5.

Control operation is interrupted at set times via the control unit 10 so that the antenna system 1 is switched into a test mode for executing the self-test. The duration of the self-test is dictated via the control unit 10.

At the start of the self-test the switch 11 is closed via the control unit 10. Moreover, the control unit 10 inputs a control command into the combination device 3. One of the antennae 2 is switched to transmit by the control command from the combination device 3. The antenna 2 operated in the transmit mode is connected by the closed switch 11 to the oscillator 7 of the first receiver 4. Thus the antenna 2 operated in the transmit mode sends test signals with a test frequency which is given by the oscillator 7 of the first receiver 4.

Feasibly the antenna 2 operated in transmit mode is not one of the antennae 2 of the antenna system 1 which are being used for current reception of broadcast signals.

Furthermore, selection of the antennae 2 which are to be checked during the self-test and which are preferably connected individually in succession via the combination device 3 to the second receiver 4' takes place using the control unit 10.

The test signals transmitted by the antenna 2 operated in the transmit mode are coupled to the antenna 2 which is to be checked and which is connected to the second receiver 4'. The test signals received by this antenna 2 are evaluated in the second receiver 4'.

The frequency of the second receiver 4' is tuned to the test frequency which is generated in the oscillator 7 of the first receiver 4. If for example the test frequency is 100 MHz, the bandpass filter 8' of the second receiver 4 is tuned accordingly to this test frequency. In particular, the oscillator 7' of the second receiver 4' is tuned to the test frequency. In this example its frequency is 110.7 MHz so that the intermediate frequency signal at the output of the mixer 6' is 10.7 MHz, the downstream bandpass filter 9' being tuned to this intermediate frequency.

Expediently the test frequency, i.e. the frequency of the oscillator 7 of the first receiver 4, can be tuned via the control unit 10. Accordingly, the frequency of the oscillator 7' of the second receiver 4' also is changed.

The arrangement formed in this way for running the self-test thus has a two-channel structure. The first receiver 4 with the antenna 2 operated in the transmit mode forms a first channel, while the second receiver 4' with the antenna 2 to be checked forms the second channel.

The test signals are coupled into the antenna 2 to be checked by the transmitting antenna. The corresponding reception levels on the second receiver 4' are detected in the level measurement device 12 and are read into the control unit 10.

In doing so the reception levels detected with the level measurement device 12 provide actual values which are compared in the control unit 10 to the setpoints which are stored and specified there. In addition or alternatively, the signals provided to evaluate the reception quality and which are obtained from the signal processing unit 5 as the output signals of the second receiver 4' can be read as actual values into the control unit 10 and can be compared there in turn with suitable setpoints.

In general, the comparison of the current values to the setpoints in the control unit 10 provides a measure of quality for the signals which are being received with the antenna 2 which is to be checked. Preferably comparison of actual values to the setpoints takes place using the tolerance ranges given in the control unit 10. Relatively fault-free operation of the antenna system 1 exists when the actual values agree with the setpoints within the respective tolerance ranges.

In testing of operation, preferably all the antennae 2 required for reception are tested. To ensure that testing of operation is as reliable and comprehensive as possible, the test frequency within a given frequency range is changed during the self-test.

When the self-test has been completed by the control unit 10, the switch 11 is opened and the antenna which is operated during the self-test in the transmit mode is switched again to the reception mode.

| Reference number list | |
|---|---|
| (1) | antenna system |
| (2) | antenna |
| (3) | combination device |
| (4) | receiver |
| (4') | receiver |
| (5) | signal processing unit |
| (6) | mixer |
| (6') | mixer |
| (7) | oscillator |
| (7') | oscillator |
| (8) | bandpass filter |
| (8') | bandpass filter |
| (9) | bandpass filter |
| (9') | bandpass filter |
| (10) | control unit |
| (11) | switch |
| (12) | level measurement means |

The invention claimed is:

1. An antenna system having at least two antennae and at least two receivers and having a self-test circuit comprising:
   a combination device to which all of said antennae are connected;
   said combination device being connected both to a first receiver and also connected to a second receiver,
   said combination device including combination circuit means for interconnecting one of said antennae as a first antenna to said first receiver and also for interconnecting one of the remaining antennae as a second antenna to said second receiver;
   a control unit connected to said combination device to direct that said combination circuit means interconnects said first antenna to transmit a test signal at a test frequency provided from said first receiver, and said control unit also is connected to said combination device to direct that said combination circuit means interconnects said second antenna to said second receiver that is tuned to the test frequency and said second receiver being connected to said control unit, said second receiver including a level measurement means for providing an actual level signal to said control unit said actual level signal is derived from a reception level signal received by said second antenna from said first antenna; and
   said control unit including a control unit circuit means for providing a self-test determination from comparison of the actual level signal with stored setpoint values.

2. The antenna system according to claim 1 further comprising said first receiver including a first mixer connected to an output of a first oscillator with a first input bandpass filter connected to said first mixer and a first output bandpass filter connected to said first mixer, and said second receiver including a second mixer connected to an output of a second oscillator with a second input bandpass filter connected to said second mixer and a second output bandpass filter connected to said second mixer, wherein said first receiver and said second receiver are both superheterodyne receivers.

3. The antenna system according to claim 2 wherein the test signal at a test frequency is provided from the first oscillator.

4. The antenna system according to claim 3 further comprising said first receiver including a switch connected to said first oscillator and also connected to said combination device with said control unit circuit means connected to said switch for actuating said switch to connect or disconnect said first oscillator to or from said combination device.

5. The antenna system according to claim 4 wherein said control unit circuit means provides a switch control signal to said switch to connect said combination device to said first oscillator during a self-test.

6. The antenna system according to claim 2 further comprising said second receiver including a level measurement device connected to an output of said second output bandpass filter wherein said level measurement device provides the actual value signal.

7. The antenna system according to claim 6 further comprises said level measurement device being connected to said control unit circuit means to provide the actual value signal that is compared to the setpoint values.

8. The antenna system according to claim 2 further comprising a signal processing unit connected to said first output bandpass filter and to said second output bandpass filter, wherein said signal processing unit provides the actual value signal to said control unit circuit means.

9. The antenna system according to claim 2 wherein said second oscillator is tuned to a test frequency to provide the test signal at the test frequency during self-test.

10. The antenna system according to claim 2 wherein said control unit circuit means provides signals to said first oscillator to set output frequencies from said first oscillator.

11. The antenna system according to claim 10 wherein the output frequencies of said first oscillator and said second oscillator are changed within a given frequency range for carrying out the self-test.

12. The antenna system according to claim 1 further comprising a signal processing unit connected to both said first receiver and to said second receiver, wherein said signal processing unit provides the actual value signal to said control unit circuit means.

13. The antenna system according to claim 1 wherein said control unit circuit means is a microcontroller.

14. The antenna system according to claim 1 wherein said antenna system is integrated in a motor vehicle.

15. The antenna system according to claim 14 wherein said antennae are integrated into a rear window of said motor vehicle.

16. A method for antenna and receiver system self-testing, said antenna and receiver system having at least two antennae, at least two receivers and having a self-test circuit, the method comprising:
connecting a combination device to all of said antennae;
connecting said combination device to a first receiver and to a second receiver so that any one of said antennae can be interconnected to said first receiver or said second receiver;
connecting a control unit to said combination device so that a combination circuit means interconnects a first antenna to transmit a test signal at a test frequency provided from said first receiver, and also connecting said control unit to said combination device so that said combination circuit means interconnects a second antenna to said second receiver that is tuned to the test frequency and outputting from said second receiver to said control unit an actual level signal derived from a reception level signal received by said second antenna from said first antenna; and
using a control unit circuit means to compare the actual level signal with stored setpoint values to provide a self-test determination.

17. The method according to claim 16 further comprising:
connecting a first mixer to an output of a first oscillator, connecting a first input bandpass filter to said first mixer and connecting a first output bandpass filter to said first mixer, said first receiver includes the interconnected first mixer, first oscillator, first input bandpass filter and first output bandpass filter; and
connecting a second mixer to an output of a second oscillator, connecting a second input bandpass filter to said second mixer and connecting a second output bandpass filter to said second mixer, said second receiver includes the interconnected second mixer, second oscillator, second input bandpass filter and second output bandpass filter;
wherein said first receiver and said second receiver are superheterodyne receivers.

18. The method according to claim 17 further comprising providing the test signal at a test frequency from said first oscillator.

19. The method according to claim 18 further comprising connecting a switch to said control unit and interconnecting said switch to both said first oscillator and said combination device wherein control of said switch is provided from said control unit circuit means to actuate said switch to connect or disconnect said first oscillator to or from said combination device.

20. The method according to claim 19 wherein said switch only is closed by said control unit circuit means to connect said combination device to said first oscillator during a self-test.

21. The method according to claim 17 further comprising connecting a level measurement device to an output of said second output bandpass filter wherein said level measurement device provides the actual value signal.

22. The method according to claim 21 further comprising connecting said level measurement device to said control unit circuit means to provide the actual value signal that is compared to the setpoint values.

23. The method according to claim 17 further comprising interconnecting a signal processing unit to both said first output bandpass filter and to said second output bandpass filter, wherein said signal processing unit provides the actual signal to said control unit circuit means.

24. The method according to claim 17 further comprising tuning said second oscillator to a test frequency to provide the test signal at the test frequency during self-test.

25. The method according to claim 17 further comprising providing signals from said control unit circuit means to said first oscillator to set output frequencies from said first oscillator.

26. The method according to claim 25 further comprising changing the output frequencies of said first oscillator and said second oscillator to be within a given frequency range for carrying out the self-test.

27. The method according to claim 16 further comprising connecting a signal processing unit to said first receiver and to said second receiver, wherein said signal processing unit provides the actual value signal to said control unit circuit means.

28. An antenna system having at least four antennae and at least two receivers and also having a self-test circuit comprising:
a combination device to which all of said antennae are connected;
said combination device being connected both to a first receiver and also connected to a second receiver,
said combination device including combination circuit means for interconnecting one of said antennae as a first antenna to said first receiver and also for interconnecting one of the remaining antennae as a second antenna to said second receiver;
a control unit connected to said combination device to direct that said combination circuit means interconnects a said first antenna to transmit a test signal at a test frequency provided from said first receiver, and said control unit also is connected to said combination device to direct that said combination circuit means interconnects a said second antenna to said second receiver that is tuned to the test frequency and said second receiver being connected to said control unit, said second receiver including a level measurement means for providing a first actual level signal to said control unit said actual level signal is derived from a first reception level signal received by said second antenna from said first antenna;
said control unit is connected to said combination device to direct that said combination circuit means interconnects a third antenna to transmit a second test signal at a second test frequency provided from said first receiver, and said control unit also is connected to said combination device to direct that said combination circuit means interconnects a fourth antenna to said second receiver that is tuned to the second test frequency and said second receiver being connected to said control unit, said second receiver including a level measurement means for providing a second actual level signal derived from a second reception level signal received by said fourth antenna from said third antenna; and said control unit including a control unit circuit means for providing a self-test determination from comparison of the first actual level signal with stored set point values.

29. The antenna system according to claim 28 further comprising said second receiver comparing the first actual level signal to the second actual level signal to identify which actual level signal has a better signal/noise ratio.

30. A method for antenna and receiver system self-testing, said antenna and receiver system having at least four antennae, at least two receivers and having a self-test circuit, the method comprising:
  connecting a combination device to all of said antennae;
  connecting said combination device to a first receiver and to a second receiver so that any one of said antennae can be interconnected to said first receiver or said second receiver;
  connecting a control unit to said combination device so that a combination circuit means interconnects a first antenna to transmit a first test signal at a test frequency provided from said first receiver, and also connecting said control unit to said combination device so that said combination circuit means interconnects a second antenna to said second receiver that is tuned to the first test frequency and outputting from said second receiver to said control unit a first actual level signal derived from a first reception level signal received by said second antenna from said first antenna;
  connecting said control unit to said combination device so that said combination circuit means interconnects a third antenna to transmit a second test frequency provided from said first receiver, and also connecting said control unit to said combination device so that said combination circuit means interconnects a fourth antenna to said second receiver that is tuned to the second test frequency and outputting from said second receiver to said control unit a second actual level signal derived from a second reception level signal received by said fourth antenna from said third antenna; and
  using a control unit circuit means to compare the first actual level signal and the second actual level signal with stored setpoint values to provide self-test determinations.

31. The method according to claim 30 further comprising using said second receiver to compare the first actual level signal to the second actual level signal to identify which actual level signal has a better signal/noise ratio.

* * * * *